(12) United States Patent
Natarajan et al.

(10) Patent No.: US 8,644,611 B2
(45) Date of Patent: Feb. 4, 2014

(54) SEGMENTAL RESCORING IN TEXT RECOGNITION

(75) Inventors: Premkumar Natarajan, Sudbury, MA (US); Rohit Prasad, Acton, MA (US); Richard Schwartz, Ashburn, VA (US); Krishnakumar Subramanian, Malden, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 450 days.

(21) Appl. No.: 12/477,582

(22) Filed: Jun. 3, 2009

(65) Prior Publication Data

US 2010/0310172 A1     Dec. 9, 2010

(51) Int. Cl.
G06K 9/18     (2006.01)
G06K 9/62     (2006.01)
G06K 9/68     (2006.01)
G06K 7/10     (2006.01)

(52) U.S. Cl.
USPC ............ 382/186; 382/215; 382/228; 382/321

(58) Field of Classification Search
None
See application file for complete search history.

(56) References Cited

U.S. PATENT DOCUMENTS

| | | | | |
|---|---|---|---|---|
| 5,878,164 A * | 3/1999 | Brown et al. | ................. | 382/190 |
| 6,256,410 B1 * | 7/2001 | Nathan et al. | ................. | 382/187 |
| 6,285,786 B1 * | 9/2001 | Seni et al. | ..................... | 382/187 |
| 7,298,903 B2 * | 11/2007 | Wang et al. | .................... | 382/186 |
| 2002/0097910 A1 * | 7/2002 | Guha | ........................... | 382/187 |
| 2008/0025610 A1 * | 1/2008 | Abdulkader | ................. | 382/185 |
| 2008/0095442 A1 * | 4/2008 | Ekin et al. | ..................... | 382/187 |
| 2008/0123940 A1 * | 5/2008 | Kundu et al. | ................. | 382/159 |

OTHER PUBLICATIONS

Natarajan, The BBN Byblos Hindi OCR System, 2005, Proceedings of SPIE-IS&T Electronic Imaging, SPIE vol. 5676, pp. 10-16.*

* cited by examiner

*Primary Examiner* — Bhavesh Mehta
*Assistant Examiner* — David F Dunphy
(74) *Attorney, Agent, or Firm* — Occhiuti & Rohlicek LLP

(57) ABSTRACT

A method for text recognition includes generating a number of text hypotheses for an image, for example, using an HMM based approach using fixed-width analysis features. For each text hypothesis, one or more segmentations are generated and scored at the segmental level, for example, according to character or character group segments of the text hypothesis. In some embodiments, multiple alternative segmentations are considered for each text hypothesis. In some examples, scores determined in generating the text hypothesis and the segmental score are combined to select an overall text recognition of the image.

34 Claims, 4 Drawing Sheets

START
103  RECEIVE IMAGE
113  EXTRACT SHORT-SPAN FEATURES FROM RECEIVED IMAGE
123  ESTIMATE N-BEST RECOGNITION RESULTS, EACH RESULT INCLUDING A SEQUENCE OF L CHARACTERS; A FIXED-WIDTH ANALYSIS (FWA) CHARACTER SEGMENTATION; AND A SHORT-SPAN SCORE
133  FOR EACH RECOGNITION RESULT (1 THROUGH N) DO
     {
203      PRODUCE M VARIABLE-WIDTH ANALYSIS (VWA) CHARACTER SEGMENTATIONS BY RESEGMENTING THE FWA CHARACTER SEGMENTATION (i.e., CHANGE THE WIDTH OF ONE OR MORE SEGMENTS) SUCH THAT THERE ARE L SEGMENTS
213      FOR EACH VWA SEGMENTATION (1 THROUGH M) AND THE FWA SEGMENTATION DO
         {
303          FOR EACH CHARACTER SEGMENT (1 THROUGH L) OF SEGMENTATION DO
             {
403              EXTRACT LONG-SPAN FEATURES FROM THE SEGMENT
413              CALCULATE A LONG-SPAN SCORE, $S_i$ }
313          COMBINE $S_i$ FOR L SEGMENTS TO PRODUCE A LONG-SPAN SEGMENTATION SCORE}
223      COMBINE THE LONG-SPAN SEGMENTATION SCORES TO PRODUCE AN OVERALL LONG-SPAN SEGMENTATION SCORE}
143  COMBINE THE SHORT-SPAN SCORE AND THE OVERALL LONG-SPAN SCORE TO PRODUCE A COMBINED SCORE
153  RANK THE N-BEST HYPOTHESES USING THE COMBINED SCORE
163  SELECT AS THE BEST HYPOTHESIS THE HYPOTHESIS HAVING THE LARGEST COMBINED SCORE

END

FIG. 4

SEGMENTAL RESCORING IN TEXT RECOGNITION

STATEMENT AS TO FEDERALLY SPONSORED RESEARCH

Aspects of the invention described in this document were made with government support under contract HR0011-08-C-0004 awarded by the Defense Advanced Research Projects Agency (DARPA). The government has certain rights in the invention.

BACKGROUND

This description relates to rescoring text hypotheses in text recognition based on segmental features.

Offline printed text and handwriting recognition (OHR) can be a challenging research problem for many reasons. In many recognition approaches, segmentation of handwritten text is inaccurate because of stylistic variations in connected scripts. Also, images suffer degradations that result in breaks and merges in glyphs, which creates new connected components that are not accurately recognized by classifiers. Statistical approaches have been developed that do not rely on segmentation, but such systems lack the use of segmental features.

SUMMARY

In one aspect, in general, a method for text recognition from an image includes generating a number of text hypotheses, for example, using an HMM based approach using fixed-width analysis features. For each text hypothesis, one or more segmentations are generated and scored at the segmental level, for example, according to character or character group segments of the text hypothesis. In some embodiments, multiple alternative segmentations are considered for each text hypothesis. In some examples, scores determined in generating the text hypothesis and the segmental score are combined to select an overall text recognition of the image.

In general, in an aspect, a method for text recognition includes generating a plurality text hypotheses for an image that includes text, each text hypothesis being associated with a first score. For each text hypothesis of the generated hypotheses, data representing one or more segmentations of the image associated with the hypothesis is formed. Each segmentation includes a series of segments of the image, and each segment corresponds to a part of the text hypothesis. For each of the segmentations, and for each segment in the segmentation, data is formed representing segmental features of the segment. A segmental score is determined for each segment according to the segmental features of the segment and the corresponding part of the text hypothesis associated with the segmentation including the segment. For each text hypothesis, an overall segmental score is determined according to the determined segmental score for the segments of the one or more segmentations associated with the text hypothesis, and an overall score is determined by combining the overall segmental score and the first score (or sets of scores) associated with the hypotheses. Data representing a text recognition of the image is provided according to the determined overall score for each of the generated text hypotheses for the image.

Implementations of the method may include one or more of the following features.

Generating the plurality of text hypotheses includes forming a series of analysis features of the image and generating the text hypothesis such that each character of the text hypothesis corresponds to a sequence of one or more of the analysis features, at least some characters corresponding to sequences of multiple analysis features.

Forming the series of analysis features includes forming a series of substantially regularly spaced analysis features of the image.

Forming the series of analysis features includes forming a series of substantially irregularly spaced analysis features of the image.

Generating the plurality of text hypotheses includes applying a statistical recognition approach that accepts the formed series of analysis features to determine the text hypotheses.

Applying the statistical recognition approach includes applying a Hidden Markov Model (HMM) recognition approach.

Generating the plurality text hypotheses for the image forming includes generating a first segmentation associated with each hypothesis, and wherein forming the data representing the one or more segmentations includes forming segmentations based on the first segmentation for the hypothesis.

Forming the segmentations based on the first segmentation includes iteratively forming successive segmentations.

Iteratively forming the successive segmentations includes using the overall segmental scores in determining successive segmentations.

Forming the segmentations based on the first segmentation includes searching for a set of best segmentations.

Forming the data representing segmental features of each segment includes forming features based on a distribution of pixels values in the segment of the image.

Forming the features includes determining quantitative features.

Forming the features includes determining stroke related features.

Forming the features includes determining categorical features.

Determining the segmental score for each segment includes determining a score that represents a degree to which segmental features for the segment are representative of the corresponding part of the text hypothesis that is associated with that segment.

Determining the score that represents the degree includes applying a classifier trained on examples of characters and associated segmental features of image segments for the examples of the characters.

Applying the classifier includes applying a Support Vector Machine (SVM) approach.

Applying the classifier includes a Neural Network approach.

In general, in an aspect, a text recognition system includes a first text recognition system configured to generating a plurality text hypotheses for an input image, each text hypothesis being associated with a first score, the first recognition system being further configured, for each text hypothesis of the generated hypotheses, to form data representing one or more segmentations of the image associated with the hypothesis, each segmentation including a series of segments of the image, each segment corresponding to a part of the text hypothesis. The system includes a segment processor configured to accept the generated text hypotheses and associated segmentations from the first recognition system, and, for each text hypothesis, form one or more segmentations of the image associated with the hypothesis, each segmentation including a series of segments of the image, each segment corresponding to a part of the text hypothesis, and for each of the one or more segmentations, for each segment in the segmentation, forming data representing segmental features of the segment. The segment processor of the system includes a segment scorer for determining a segmental score for each segment according to the segmental features of the segment and the corresponding part of the text hypothesis associated with the segmentation including the segment. The segment processor of the system is further configured, for each text hypothesis, to determine an overall segmental score according to the determined segmental score for the segments of the one or more segmentations associated with the text hypothesis. The system further includes a scorer configured, for each text hypothesis, to determine an overall score by combining the overall segmental score and the first score generated by the first recognition system, and to output data representing a text recognition of the image according to the determined overall score for each of the generated text hypotheses for the image.

In general, in an aspect, software instructions are embodied on a computer readable medium for causing a data processing system to generate a plurality text hypotheses for an image that includes text, each text hypothesis being associated with a first score; for each text hypothesis of the generated hypotheses, form data representing one or more segmentations of the image associated with the hypothesis, each segmentation including a series of segments of the image, each segment corresponding to a part of the text hypothesis; for each of the one or more segmentations, for each segment in the segmentation, form data representing segmental features of the segment; determine a segmental score for each segment according to the segmental features of the segment and the corresponding part of the text hypothesis associated with the segmentation including the segment; for each text hypothesis, determine an overall segmental score according to the determined segmental score for the segments of the one or more segmentations associated with the text hypothesis, and determine an overall score by combining the overall segmental score and the first score associated with the hypotheses; and provide data representing a text recognition of the image according to the determined overall score for each of the generated text hypotheses for the image.

Aspects may have one or more of the following advantages.

Scoring text hypotheses according to segmental features, such as segmental features determined according to a pixel distribution throughout an image segment associated with a character (or other corresponding part, e.g., a character sequence or group) provides higher accuracy that using features associated with fixed-width analysis of the image.

Applying segmental analysis to a segmentation determined by a first OCR engine, such as a segmentation determined by a Hidden Markov Model (HMM) based engine, provides efficient processing of the image.

Considering alternative segmentations that are related to the segmentation determined by the OCR engine provides potentially better match between segmental models and hypothesized segmentations, without requiring computationally expensive searching though a large set of segmentations and/or without allowing segmentations that are largely inconsistent with the segmentation produced by the first OCR engine.

A classification based approach to segmental scoring can be used with a combination of numerical and categorical segmental features.

Other features and advantages of the invention are apparent from the following description, and from the claims.

DESCRIPTION OF DRAWINGS

FIG. 4 is a flowchart of an example text recognition process.

DESCRIPTION

Overview

Figure 1:
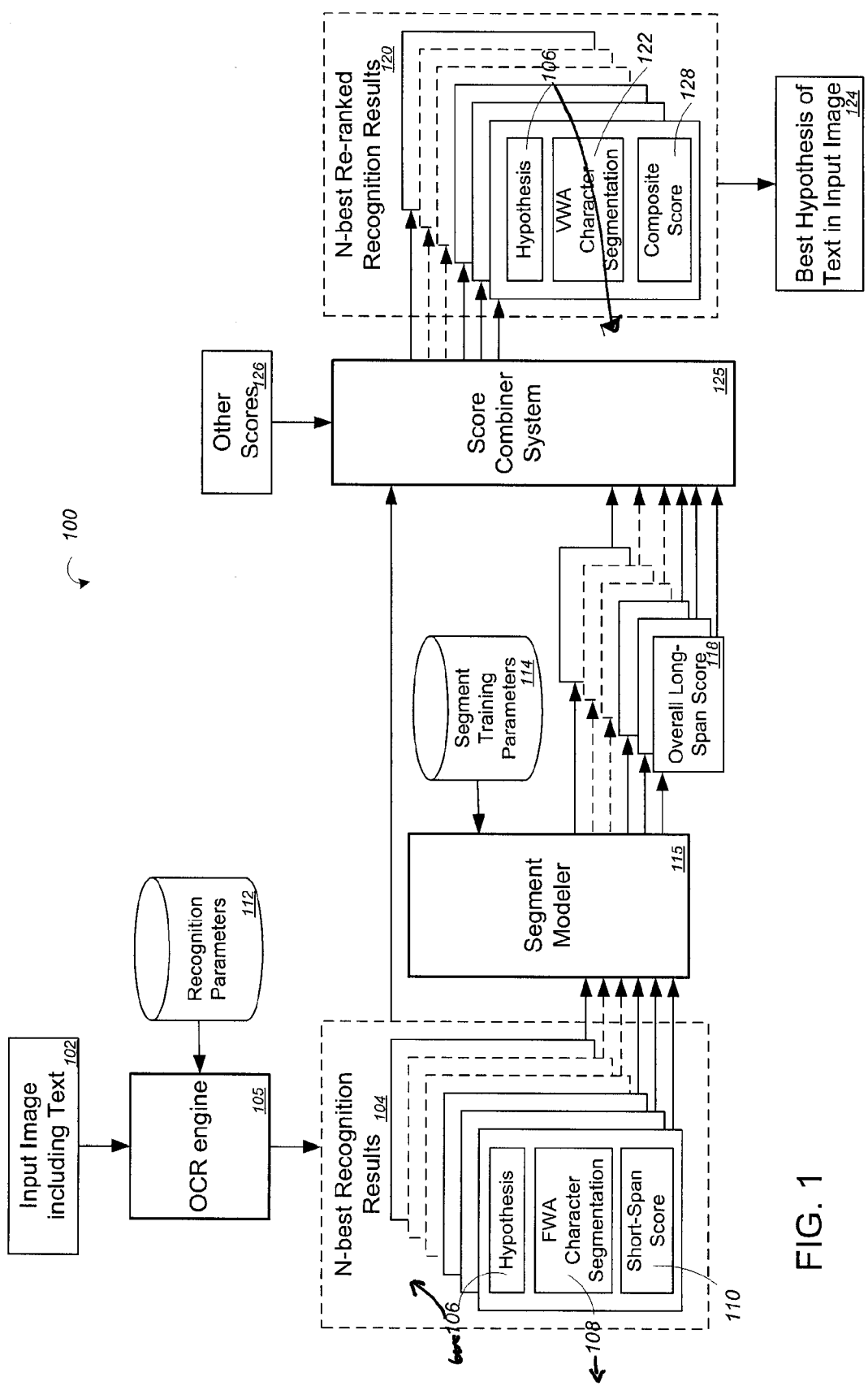
FIG. 1 is an example text recognition system.

Referring to FIG. 1, an example of a text recognition system 100 processes an input image 102 that includes text and produces a best hypothesis 124 of the text in the input image. In various examples, the text may be printed, handwritten, or script text, and the text hypothesis may include a character sequence that forms one or more words or parts of a word.

Generally, the text recognition system 100 includes an optical character recognition (OCR) engine 105, a segment modeler 115, and a score combiner 125. The OCR engine 105 produces a set of recognition results 104 for the text in the image 102. Each recognition result 104 includes a text hypothesis 106, for example, represented as a list or sequence of hypothesized characters, a segmentation that divides the image 102 into segments (e.g., rectangular portions of the image) corresponding to the text, and a score that represents the quality or expected accuracy of the text hypothesis. In this description, the segments produced by the OCR engine 105 are referred to as "fixed-width analysis (FWA) character segmentations 108." In some implementations, the number of segments in an FWA character segmentation 108 equals the number of hypothesized characters in the associated text hypothesis 106, and the width of each segment (e.g., number of pixels) is determined according to hypothesized widths of the corresponding character in the input image 102. The score (referred to in this description as a "short-span score 110") is based on "short-span" features of the image 102. As will be explained in greater detail in a later section, the OCR engine 105 relies on statistically estimated recognition parameters 112 for creating the text hypotheses 106, FWA character segmentations 108, and short-span scores 110. The recognition results 104 for a particular input image 102 may be ranked in an order according to the associated short-span scores 110.

The segment modeler 115 processes each of the recognition results 104 to produce a corresponding "long span" score 118 for each recognition result. In some embodiments, for each recognition result 104, the segment modeler 115 uses the FWA character segmentation 108 and corresponding text hypothesis 106 and calculates the overall "long-span" score 116 for the result based on long-span features for each character segment. As explained in greater detail in a later section, these long-span features represent or yield, via one or more appropriate transformations, probabilities that the text within each segment belongs to a character class. These probabilities are determined by analyzing training data and calculating segment training parameters 114.

In some embodiments, for each recognition result 104, the segment modeler 115 considers multiple alternative character segmentations for the text hypothesis 106 that are different than the FWA character segmentation, and determines long-span features for each segment and computes a long-span score 116 (not shown) for each alternative segmentation (referred to in this description as "variable-width analysis (VWA) character segmentation 122. The segment modeler 115 uses the multiple VWA character segmentations 122 for a given text hypothesis 106 to determine the overall long-span score for the result, for example, accord to the VWA character segmentation that is associated with the best score for the characters in the text hypothesis. The segment modeler 115 passes an overall long-span score 118, and optionally the associated VWA character segmentation 122 to the score combiner 125.

For each text hypothesis 106, the score combiner 125 combines the associated short-span score 110, the overall long-span score 118, and optionally other scores 126 (e.g., language model probabilities) to produce a recognition result 120 that includes a composite score 128 for the text hypothesis. The recognition result 120 also includes the text hypothesis 106, and the VWA character segmentation. In some examples, the score combiner 125 uses a weighted average of logarithmic representations of the short-span and long-span scores, with the respective weights being selected, for example, according to performance on a development set of data.

The set of recognition results 120 are then be re-ranked according to the composite scores, and the text hypothesis 106 with the highest composite score 128 is selected as the best hypothesis 124 of the text in the input image 102.

Optical Character Recognition Systems

Figure 2:
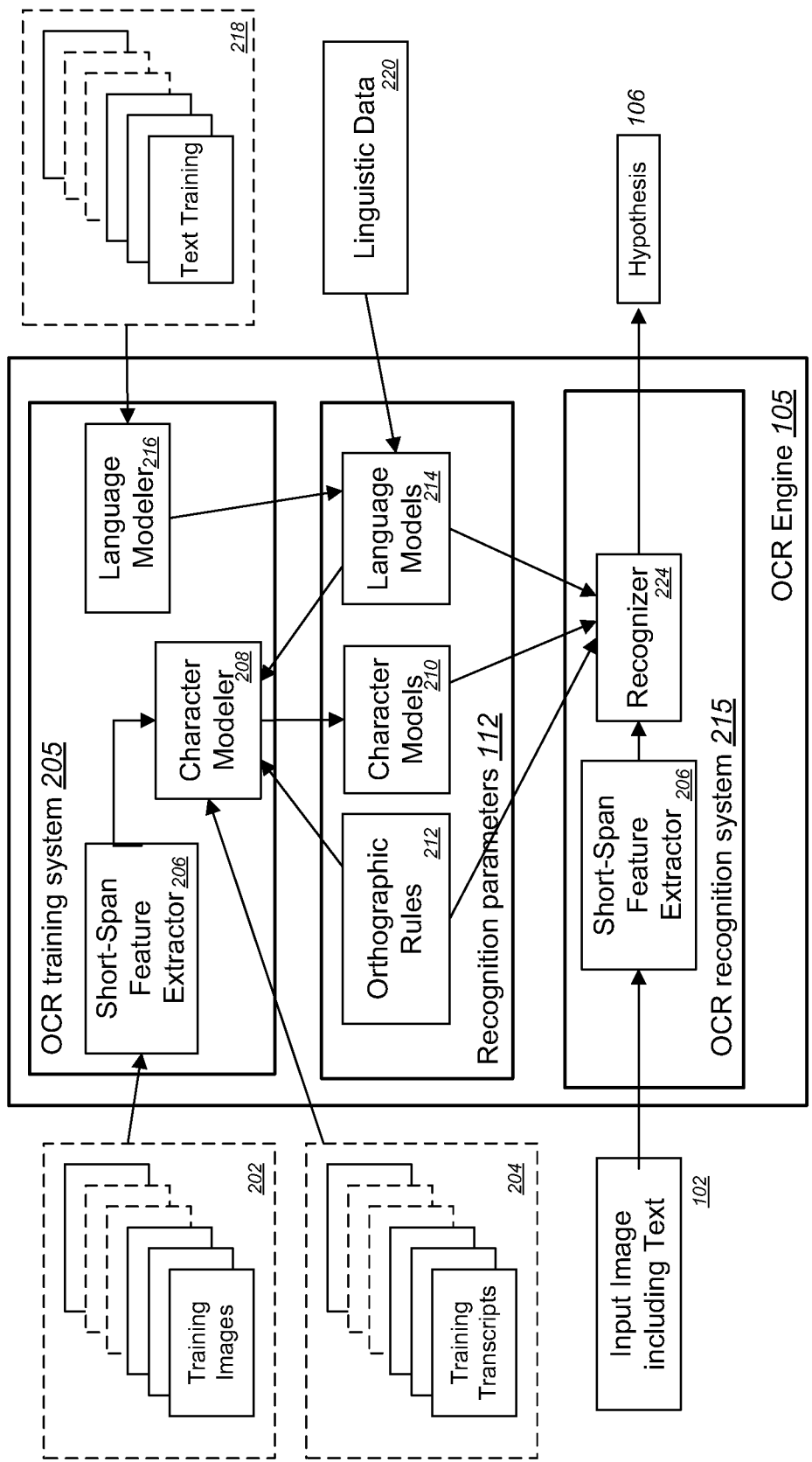
FIG. 2 is an example optical character recognition engine.

Referring to FIG. 2, in some examples, the OCR engine 105 of the text recognition system 100 uses a hidden Markov model (HMM) technique (e.g., the BBN Byblos developed for recognizing text in printed documents, as described in P. Natarajan, et al., "Multilingual Machine Printed OCR," *International Journal Pattern Recognition and Artificial Intelligence, Special Issue on Hidden Markov Models in Vision*, pp. 43-63, 2001, which is incorporated by reference here). One advantage of using a HMM-based system is that it does not rely on explicit segmentation of word/line images into smaller units such as sub-words or characters. The OCR engine 105 includes a training system 205, recognition parameters 112, and a recognition system 215.

The training system 205 processes a set of training images 202 and a corresponding set of training transcriptions 204 to produce recognition parameters 112 to be used by the recognition system 215 for processing the input image 102, shown in FIG. 1, to generate recognition results 104.

In some examples, the input images 102 include text from a variety of different languages or scripts, and recognition parameters 112 corresponding to the language or script in the image are used to configure the recognition system 215.

The training system 205 applies a short-span feature extractor 206 to each training image 202. In some examples, this feature extraction identifies the location of (e.g., the baselines and letter height) of one of more lines of text present in the image 102. Each line of text contains a number of pixels and each character, word, or part of a word, can be contained within a segment of the line containing some of those pixels.

In order to generate the text hypothesis 106 and an FWA character segmentation 108, the short-span feature extractor 206 divides each line of text into a series of uniform windows (which can be overlapping or non-overlapping), each window having a width of a number of pixels and a vertical extent of, for example, the line height in the image 102. The short-span feature extractor 206 computes a feature vector for each window such that each feature vector is a numerical representation of the text image within the window. These windows are typically narrow and capture what are called "short span" features, such as the so-called "PACE" features: percentile of intensities, angle, correlation, and energy. In various examples of the system, the short-span feature vector can include one or more of moments, line-based representations, Fourier descriptors, shape approximation, topological features, shape approximation, or other features. Example methods used by the short-span feature extractor 206 include those described in P. Natarajan, et al., "Multilingual Machine Printed OCR," *International Journal Pattern Recognition and Artificial Intelligence, Special Issue on Hidden Markov Models in Vision*, pp. 43-63, 2001, or P. Natarajan, et al., "Multilingual Offline Handwriting Recognition," *Proceedings Summit on Arabic and Chinese Handwriting*, College Park, Md., 2006, which is incorporated by reference here.

For the set of training images 202, a character modeler 208 receives the sequence of feature vectors produced by the short-span feature extractor 206 for those images, and the training transcript 204 corresponding to those images, and processes the data to produce character models 210, for example, by applying an iterative parameter estimation algorithm, such as the Estimate Maximize (EM) algorithm. In some examples, the character models 210 are multi-state, left-to-right hidden Markov models (HMMs) whose parameters are estimated by the character modeler 208. Generally, each state of a character model (e.g., the HMM) has an associated output probability distribution over possible feature vectors provided by the short-span feature extractor 206. The model topology (e.g., a number of states in the HMM, allowable transitions) can be optimized for each type of script used in the videotext OCR system 100.

The recognition parameters 112 produced by the training system 205 optionally also include orthographic rules 212 and language models 214, in addition to the estimated character models 210. In some examples, the language models 214 may include a lexicon as well as a statistical language model produced by a language modeler 216. The statistical language model may include a character or word n-gram language model (LM) that the language modeler 216 estimates from one or more of text training 218, the training transcripts 204, linguistic data 220, or other available sources of text.

In some examples, the recognizer 224 performs a two-pass search (e.g., as described in S. Austin, et al., "The forward-backward search algorithm," IEEE Int. Conf. Acoustics, Speech, Signal Processing, Toronto, Canada, Vol. V, 1991, pp. 697-700, which is incorporated by reference here). The first pass uses a relatively simple language model (e.g., a statistical bigram model) to generate a lattice of characters or words. The second pass uses a more complex model (e.g., a trigram model) and optionally more detailed character HMMs to generate the text hypothesis 106, which in various examples may include a 1-best hypothesis, N-best hypotheses, or a lattice.

The text hypothesis 106 contains a sequence of L characters. The fixed-width analysis (FWA) character segmentation 108 produced by the recognizer 224 has L regions or segments, and each segment is associated with a width (e.g., a number of pixels) within the image. The beginning and the end of a segment can be identified, for example, by a pixel number. Likewise, a series of segments can be identified by a vector of numbers. In some examples, the segments can be adjacent, such that each segment is identified by a width on the text line. In some examples, the segments can be "extended" to include a vertical extent of the text line in addition to a width.

The short-span score 110 produced by the OCR engine represents a quality of match between the text hypothesis and the image 102 processed by the OCR engine 105. That is, the short-span score 110 provides an measure of how closely the text hypothesis 106 matches the character models 210 and other recognition parameters 112.

Segment Modeling

Figure 3:
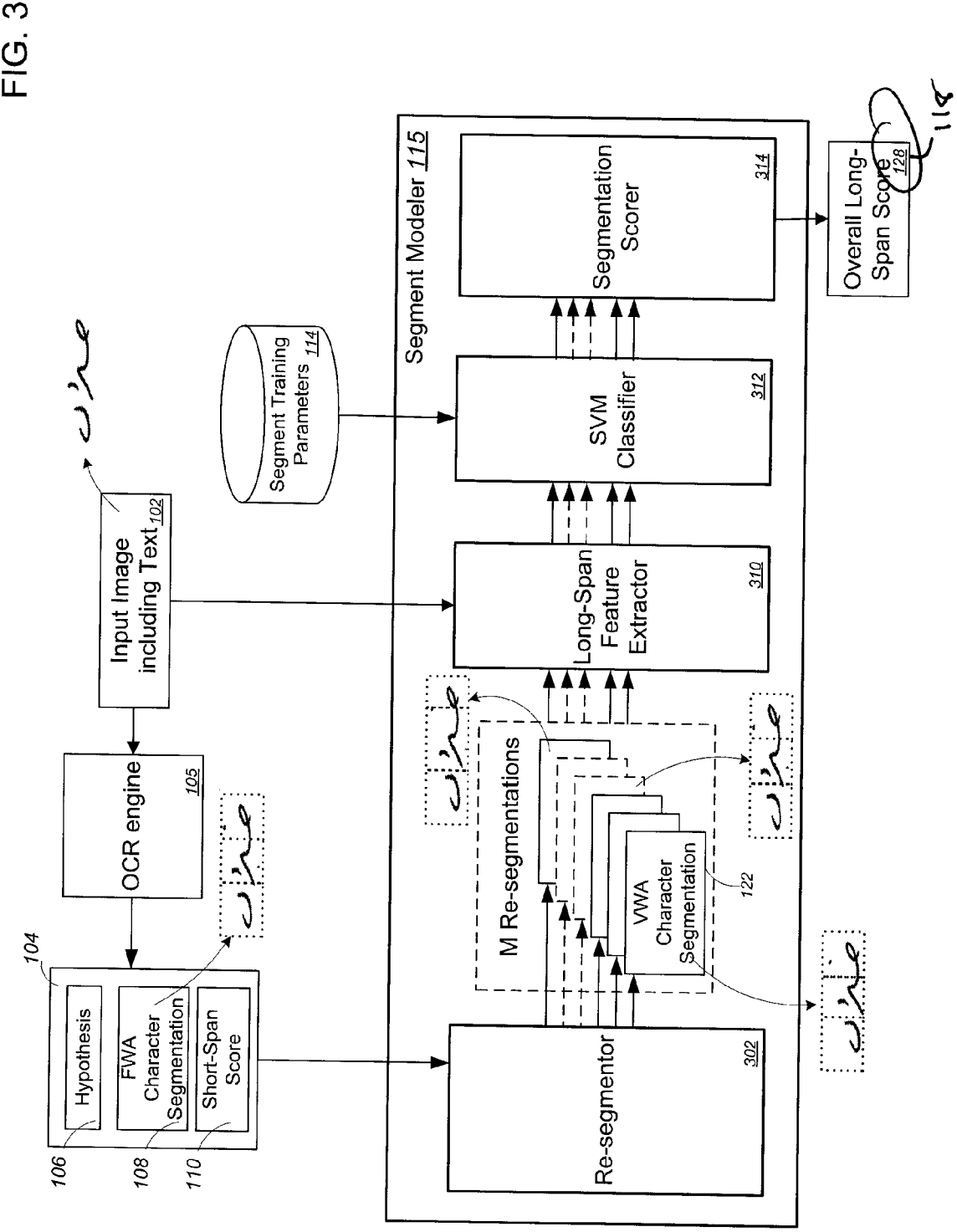
FIG. 3 is an example stochastic segment modeler.

Referring to FIG. 3, an example input image 102 is shown that corresponds to a digitized sample of handwritten Arabic text. For this input image, the OCR engine 105 produces n-best recognition results 104. One such recognition result 104 is shown in the Figure. As introduced above, the result includes the text hypothesis 106, the fixed-width analysis (FWA) character segmentation 108 (illustrated as dotted boxes superimposed on the image 102), and the short-span score 110. The recognition result 104 is passed from the OCR engine 105 to the segment modeler 115. In the embodiment illustrated in FIG. 3, the segment modeler 115 includes a re-segmentor 302, a long-span feature extractor 310, a support vector machine (SVM) classifier 312, and a segmentation scorer 314. In some embodiments, the re-segmentor 302 is not used, and only the single FWA segmentation is considered in the segment modeler.

In embodiments in which alternative segmentations are considered in addition to the FWA segmentation, the segments specified by the FWA character segmentation 108, which is determined by the OCR engine 105, may not be the best segmentation, for example, in the sense of being the most compatible with the character models based on the long-span features for the character segments. In some such embodiments, the segment modeler 115 considers alternatives segmentations by the following process.

In some embodiments, each segment of a segmentation corresponds to a single character of the text hypothesis. In some embodiments, the segmentation can include segments that form character groups, for example, groups of characters that form a ligature, or common multi-letter sequences. For instance, such character groups may determined by deterministic processing of the text hypotheses or may be explicitly identified as part of the processing by the OCR engine. In some embodiments, the segmentation can include segments that include parts of characters, for example, with each segment corresponding to a particular stroke or component of a character glyph.

Each segmentation 122 (i.e., one the FWA character segmentation and/or alternative segmentations) are passed to a long-span feature extractor 310 receives the character segmentations 122 and extracts features from each segment of the character segmentation and forms a feature vector for each segment. In various examples of the long-span feature extractor, various types of analyses are used to form the feature vector for each segment. For instance, the feature vector includes one or more numerical quantities that are produced based on the distribution of pixel values in the segment. In some examples, such numerical features include a gradient feature, or a representation of the orientation of strokes in a character. In some examples, the feature vector includes structural features, or information about stroke trajectories, and a concavity feature, or information related to stroke relationships over longer distances. In some examples, the feature vector includes one or more symbolic (e.g., categorical) features, for example, based on a classification of the pixel pattern in the segment. In some examples, one or more of the features are scale invariant. Collectively, these types of features that may be produced by the long-span feature extractor 310 are referred to as "GSC features." For each input segmentation 122 provided to the long-span feature extractor, the output is that segmentations with each segment having the associated long-span feature vector computed for that segment.

The SVM classifier 312 receives a segmentation with a long-span feature vector for each segment of a character segmentation 122 for the long-span feature extractor 310 and computes a score that represents a degree to which the long-span features for each segment are representative of the hypothesized character associated with that segment. In some examples, the SVM classifier computes a quantity that represents (e.g., as a linear quantity, or as a logarithm) a probability that the character in the segment is the hypothesized character associated with that segment conditioned on the extracted long-span features for that segment.

In some examples, the SVM classifier 312 calculates the conditional character probabilities for a segment of the character segmentations 122 using the segment training parameters 114 that correlate long-span features for a segment to a likelihood of each of the possible characters. The segment training parameters 114 are generated for the SVM classifier by extracting long-span features for a set of training images (e.g., training images 202) and using the known character labels for each segment to train the classifier. An iterative training scheme can be used for the SVM classifier 312. In some examples, the segment training parameters 114 are developed by training the SVM classifier 312 using a radial basis function (RBF) kernel applied to character labels and the long-span features (e.g., GSC features) extracted from segments training images 202 or the development images 222.

For a particular segmentation 122, the segmentation scorer 314 receives the segment probabilities output from the SVM classifier 312 for each segment of the character segmentation 122. The score 312 combines the segment probabilities into a long-span score 116 (not shown) for the entire character segmentation. In some examples, the segmentation scorer 314 calculates the geometric mean of probabilities for all segments of the VWA character segmentation 122 and then takes the logarithm of the geometric mean to produce a long-span score 118 (see FIG. 1) (or alternatively, takes a linear average of logarithmic representations of the character probabilities output from the SVM classifier).

As introduced above, in some examples, the long-span score is not necessarily based only on the FWA segmentation produced by the OCR engine. In such examples, the re-segmentor 302 receives the FWA character segmentation 108 and effectively provides a set of different re-segmentations 122. Each of these segmentations is processed as described above using the long-span feature extractor 310, SVM classifier 312, and segmentation scorer 314 to compute an overall long-span score for that segmentation.

In some examples, the set of different segmentations 122 is determined by the re-segmentor 302 using a local search approach in which the boundaries and or widths of one or more segments of a current character segmentation are incrementally changed at each of a series of iterations. The variations are guided to increase the overall long-span score. That is, in some examples, the FWA segmentation is permitted to be modified somewhat to provide a locally best overall long-span score. In some examples, the search over segmentations is constrained to permit a maximum deviation of each modified boundary from the original FWA segmentation, for example, allowing a plus or minus three pixel deviation of any boundary. In some examples, the perturbation range for a boundary is dependent on the hypothesized character for that segment.

In other examples, various segmentations that deviate from the FWA segmentation are found using other techniques. For instance, a dynamic programming approach is used to identify the best re-segmentations for the image. In some examples, an output of the dynamic programming approach is a graph and/or a lattice representation of the set of segmentations.

In some examples, adjacent segments of a re-segmentation are constrained to have a common boundary by partitioning the horizontal axis of the image. In some examples, segments for adjacent characters are permitted to overlap, with certain pixels being part or more than a single segment. In some examples, adjustment of the segmentation includes determining top and bottom boundaries of the segments, such that it is not required that each segment have the same vertical extent.

In FIG. 3, an example of the re-segmentor producing a set of M re-segmentations for a single image is shown. For simplicity, only three example VWA character segmentations 122 are illustrated in FIG. 3. The widths of one or more of the three segments of the FWA character segmentation 108 have been expanded, contracted, or spatially shifted. The number of segments in the VWA character segmentations 122 is the same as in the FWA character segmentations 108.

In embodiments in which multiple alternative segmentations are provided by the segmentor 302, the segmentation scorer 314 also combines the long-span scores 116 for each of the character segmentations 122 into an overall long-span score 118. In some examples, the combination is performed by using the best overall long-span score for the alternative segmentations. In some examples, a sum or average of the long-span scores is used. The segment modeler 115 outputs this combined overall long-span score 118 corresponding to the hypothesis 106.

Scoring

Without being limited to the following, one or more of the approaches described above may be understood with reference to the following analysis. One goal of the recognition task of the text recognition system 100 is to find a hypothesized sequence of characters, C, that maximizes the probability of the sequence of characters C given I, the input image 102, denoted by $P(C|I)$. In the following description, the sequence of short-span feature vectors X is determined by the short-span feature extractor 206, and the FWA character segmentation, $S^{FWA}$ of the input image 102 is determined by the OCR engine 105. The multiple different segmentations 122 (each segmentation represented by S) are determined by the re-segmentor 302. Note that in this notation, a segmentation S includes both the long-span features for the segments and the locations of the segments in the image, with $S_i$ representing the $i^{th}$ segment (including its long-span features).

The short span score 110 determined by OCR engine 105 corresponds to probability of the hypothesized characters C give the short span features X, denoted by $P(C|X)$. The probability of the character sequence given the segmentation is denoted by $P(C|S)$, which assuming the segments are independent, can be written as the product $P(C|S)=\Pi_i P(C_i|S_i)$, where S is understood to include the computed long-span features for each of the segments, as well as the portion of the image associated with each segment.

Under a set of assumptions outlined below, the probability of a hypothesized character sequence C given an image can be approximated as $$P(C|I) = \sum_S (P(C|S)P(C|X)P(W|C))$$

where W is the sequence of segment widths determined from S. In some embodiments, this sum is then be approximated by the largest term in the sum, or by the term corresponding to the FWA segmentation.

In the approximation shown above, the terms $P(C|S)$ can be computed according to the SVM described above, or other forms of classifiers (e.g., statistical classifiers, neural networks, classification trees etc.). The terms $P(C|X)$ are provided through the scores from the HMM based OCR engine.

Finally, the terms $P(W|X)$ can be estimated separately from training data as a distribution of normalized widths.

One basis for the approximation shown above can be expressed according to the following sequence of identities and approximations:

$$P(C|I) = \sum_S P(C,S|I)$$

$$= \sum_S P(C,S|X) \quad \text{–the image is represented by the feature vector sequence}$$

$$= \sum_S P(C|S,X)P(S|X) \quad \text{–factoring the previous equation}$$

$$= \sum_S P(C|S)P(S|X) \quad \text{–assumption that S provides all the information in X about C}$$

$$= \sum_S P(C|S)P(C,W|X) \quad \text{–the segmentation S has two parts, C and widths W}$$

$$= \sum_S \frac{P(C|S)P(C|X)}{P(W|C,X)} \quad \text{–factoring the previous equation}$$

$$= \sum_S P(C|S)P(C|X)P(W|C) \quad \text{–assumption that X provides no further information about W than available in C}$$

EXAMPLES

Approaches described above were applied to two sets of experimental data—one data corpus is from the Applied Media Analytics (AMA), which we refer to as the AMA corpus and the second corpus is from the Linguistic Data Consortium (LDC), which are referred to as the LDC corpus. The AMA corpus used in the experiments consisted of Arabic handwritten documents provided by a diverse body of writers. The collection is based on a set of 200 documents with a variety of formats and layout styles. The final collection contains a TIFF scanned image of each page, an XML file for each document, which contains writer and page metadata, the bounding box for each word in the document in pixel coordinates, and a set of offsets representing parts of Arabic words (PAWs). A subset of the images, scanned at 300 dpi were used for the experiments.

The LDC corpus consisted of scanned image data of handwritten Arabic text from newswire articles, weblog posts and newsgroup posts, and the corresponding ground truth annotations including tokenized Arabic transcriptions and their English translations. It consists of 1250 images scanned at 300 dpi written by 14 different authors for training, development and testing purposes. In order to ensure a fair test set with no writer or document content in training, 229 images were held-out of the set of training images and the set of development images. One hundred twenty five images of the 1250 images were randomly chosen as the development set. A total of 48 images by four different authors constituted the test set. The details of the split are shown below in Table 1.

TABLE 1

LDC data used for rescoring experiments

| Set | #Images | #Writers |
|---|---|---|
| Train | 848 | 10 |
| Dev | 125 | 10 |
| Test | 48 | 4 |

Referring to FIG. 4, a list of pseudo-code illustrates an example process performed by the text recognizer 100 on the 48 images to determine a best text hypothesis 124 from an input image 102. The text recognizer 100 receives (103) an image (e.g., input image 102), extracts (113) short-span features (e.g., PACE features) from the received image, and estimates (123) a n-best recognition results, each result including a sequence of L characters (e.g., a text hypothesis 106); a fixed-width analysis character segmentation (e.g., FWA character segmentation 108); and a short-span score (e.g., short-span score 110).

Loop 133: For each recognition result (1 through n), the text recognizer 100 produces (203) m variable-width analysis (VWA) character segmentations by re-segmenting the FWA character segmentation (e.g., change the width of one or more segments, shift one or more segments) such that there are L segments. Loop 213: For each VWA character segmentation (1 through m) and for the FWA character segmentation, the text recognizer 100 performs the following process for each character segment (1 through L) (loop 303): extract (403) long-span features from the character segment and calculate (413) a long-span score. The text recognizer 100 combines (313) the long-span scores for all character segments of a VWA character segmentation to produce a long-span segmentation score (e.g., long-span score 116). From the m produced long-span segmentation scores, the text recognizer 100 combines (223) the long-span segmentation score to produce an overall long-span segmentation score (e.g., overall long-span score 118).

The text recognizer 100 combines (143) the short-span score and the overall long-span score to produce a combined score, then ranks (153) the n-best hypotheses using the combined score, and finally selects (163) as the best hypothesis the hypothesis having the largest combined score.

Example 1

Comparison of Manually-Labeled Segments and Automatically-Labeled Segments

An SVM classifier 312 was chosen and trained with GSC features (i.e., long-span features) extracted from manually annotated Part-of-Arabic-Words (PAWs) in the AMA data set. Manually-annotated PAW images and the corresponding PAW labels were used to train a SVM classifier 312. The PAW images and labels were randomly chosen from the AMA corpus. We used the entire PAW image to extract features. A total of 6,498 training samples from 34 PAW classes were used to train the SVM classifier 312. The SVM training setup described previously was used, except that we extracted features from PAW images instead of from automatically-generated segments. The test set consists of 848 PAW images from the same set of 34 PAW classes. From the vector of probability scores produced by the SVM for each class label, we chose the class with the highest probability as the classification label for the PAW image. The classification accuracy for this experiment was 82.8%, as shown in Table 2 below.

TABLE 2

Segment classification accuracy SVM classifier.

| Types of Units | # classes | Accuracy |
|---|---|---|
| PAWs | 34 | 82.8% |
| Variable-width analysis (VWA) segmentations | 40 | 74.7% |

Next, segments were automatically selected from word images from the AMA dataset and the extracted character segments were used for training the segment modeler 115, as described previously. The SVM classifier 312 was used and a total of 13,261 character training samples from 40 character classes were used for training. The SVM classifier 312 was then used to classify 3,315 test samples and resulted in an overall accuracy of 74.7%, as shown in Table 2 above.

Example 2

Using Long-Span Scores for Rescoring Hypotheses

In this experiment, the SVM classifier 312 uses GSC features extracted using variable-width analysis segmentations to rescore an n-best list of hypotheses as described previously. The LDC corpus was used for this experiment. The amount of data used for training, development and validation is shown in Table 1. All the training data from the LDC corpus was used for training the baseline HMM system. The SVM classifier 312 was trained using 900 randomly chosen, 2-D character images 304 for each character class. The results for this experiment, along with the results for the baseline experiment are shown in Table 3 below. The only difference between the two experiments is the addition of the long-span scores 116 for rescoring. The two experiments are otherwise identical.

TABLE 3

Results from using the HMM and language model (LM) alone or combined with VWA segmentations for N-best rescoring.

| Scores used for Rescoring | WER (%) |
|---|---|
| HMM + LM | 55.1 |
| HMM + LM + VWA | 52.8 |

From Table 3 above, we see that the addition of the long-span scores 116 for rescoring improves overall system performance by 2.3% absolute.

Implementations

In some implementations, a system includes an input for accepting the image 102 and a user interface for providing the best text hypothesis 124 to a user. In some implementations, the best text hypothesis 124 is stored as data representing the text in the image 102. For example, the text output is stored in association with the image, for example, in a database or in a meta data storage associated with the image.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A method for text recognition of a pixelated image with unknown text in a first region of said image, the method comprising:

generating a plurality text hypotheses, each text hypothesis representing the unknown text in the first region, each text hypothesis being associated with a corresponding score;

for each text hypothesis of the generated hypotheses, forming data representing one or more segmentations of the first region of the image according to the hypothesis, each segmentation including a series of segments of the image, each segment corresponding to a part of the text hypothesis;

for each of the one or more segmentations, for each segment in the segmentation, forming separate data representing segmental features of the segment;

determining a segmental score for each segment according to the segmental features of the segment and the corresponding part of the text hypothesis associated with the segmentation including the segment;

for each text hypothesis, determining an overall segmental score according to the determined segmental score for the segments of the one or more segmentations associated with the text hypothesis, and determining an overall score by combining the overall segmental score and the corresponding score associated with the hypotheses; and providing data representing a text recognition the first region of the image according to the determined overall score for each of the generated text hypotheses for the image.

2. The method of claim 1 wherein generating the plurality of text hypotheses includes forming a series of analysis features of the image, and generating the text hypothesis such that each character of the text hypothesis corresponds to a sequence of one or more of the analysis features, at least some characters corresponding to sequences of multiple analysis features.

3. The method of claim 2 wherein forming the series of analysis features includes forming a series of substantially regularly spaced analysis features of the image.

4. The method of claim 2 wherein forming the series of analysis features includes forming a series of substantially irregularly spaced analysis features of the image.

5. The method of claim 2 wherein generating the plurality of text hypotheses includes applying a statistical recognition approach that accepts the formed series of analysis features to determine the text hypotheses.

6. The method of claim 5 wherein applying the statistical recognition approach includes applying a Hidden Markov Model (HMM) recognition approach.

7. The method of claim 1 wherein generating the plurality text hypotheses for the image forming includes generating a first segmentation associated with each hypothesis, and wherein forming the data representing the one or more segmentations includes forming segmentations based on the first segmentation for the hypothesis.

8. The method of claim 7 wherein forming the segmentations based on the first segmentation includes iteratively forming successive segmentations.

9. The method of claim 8 wherein iteratively forming the successive segmentations includes using the overall segmental scores in determining successive segmentations.

10. The method of claim 7 wherein forming the segmentations based on the first segmentation includes searching for a set of best segmentations.

11. The method of claim 1 wherein forming the data representing segmental features of each segment includes forming features based on a distribution of pixels values in the segment of the image.

12. The method of claim 11 wherein forming the features includes determining quantitative features.

13. The method of claim 11 wherein forming the features includes determining stroke related features.

14. The method of claim 11 wherein forming the features includes determining categorical features.

15. The method of claim 1 wherein determining the segmental score for each segment includes determining a score that represents a degree to which segmental features for the segment are representative of the corresponding part of the text hypothesis that is associated with that segment.

16. The method of claim 15 wherein determining the score that represents the degree includes applying a classifier trained on examples of characters and associated segmental features of image segments for the examples of the characters.

17. The method of claim 16 wherein applying the classifier includes applying a Support Vector Machine (SVM) approach.

18. The method of claim 16 wherein applying the classifier includes a Neural Network approach.

19. The method of claim 1 wherein the segments of the series of segments of the image are non-overlapping segments having a rectangular shape.

20. The method of claim 19 wherein at any given point along a line through a horizontal extent of the unknown text, a line extending from the given point through the vertical extent of the unknown text crosses through only one of the segments.

21. A text recognition system for text recognition of a pixelated image with unknown text in a first region of said image, the system comprising:
   a first text recognition system configured to generate a plurality text hypotheses, each text hypothesis representing the unknown text in the first region, each text hypothesis being associated with a corresponding score, the first recognition system being further configured, for each text hypothesis of the generated hypotheses, to form data representing one or more segmentations of the first region of the image according to the hypothesis, each segmentation including a series of segments of the image, each segment corresponding to a part of the text hypothesis;
   a segment processor configured to accept the generated text hypotheses and associated segmentations from the first recognition system, and, for each text hypothesis, form one or more segmentations of the image associated with the hypothesis, each segmentation including a series of segments of the image, each segment corresponding to a part of the text hypothesis, and for each of the one or more segmentations, for each segment in the segmentation, forming separate data representing segmental features of the segment;
   wherein the segment processor includes a segment scorer for determining a segmental score for each segment according to the segmental features of the segment and the corresponding part of the text hypothesis associated with the segmentation including the segment;
   wherein the segment processor is further configured, for each text hypothesis, to determine an overall segmental score according to the determined segmental score for the segments of the one or more segmentations associated with the text hypothesis;
   the system further comprising a scorer configured, for each text hypothesis, to determine an overall score by combining the overall segmental score and the corresponding score generated by the first text recognition system, and to output data representing a text recognition the first region of the image according to the determined overall score for each of the generated text hypotheses for the image.

22. The method of claim 21 wherein the segments of the series of segments of the image are adjacent, non-overlapping segments having a rectangular shape.

23. The method of claim 22 wherein at any given point along a line through a horizontal extent of the unknown text, a line extending from the given point through the vertical extent of the unknown text crosses through only one of the segments.

24. Software instructions embodied on a non-transitory computer readable medium for causing a data processing system to:
   generate a plurality text hypotheses, each text hypothesis representing unknown text in a first region of a pixelated image that includes text, each text hypothesis being associated with a first score;
   for each text hypothesis of the generated hypotheses, form data representing one or more segmentations of the first region of the image according to the hypothesis, each segmentation including a series of segments of the image, each segment corresponding to a part of the text hypothesis;
   for each of the one or more segmentations, for each segment in the segmentation, form separate data representing segmental features of the segment;
   determine a segmental score for each segment according to the segmental features of the segment and the corresponding part of the text hypothesis associated with the segmentation including the segment;
   for each text hypothesis, determine an overall segmental score according to the determined segmental score for the segments of the one or more segmentations associated with the text hypothesis, and determine an overall score by combining the overall segmental score and the first score associated with the hypotheses; and
   provide data representing a text recognition the first region of the image according to the determined overall score for each of the generated text hypotheses for the image.

25. The method of claim 24 wherein the segments of the series of segments of the image are adjacent, non-overlapping segments having a rectangular shape.

26. The method of claim 25 wherein at any given point along a line through a horizontal extent of the unknown text, a line extending from the given point through the vertical extent of the unknown text crosses through only one of the segments.

27. A computer-implemented method for text recognition of an optically acquired image, the method comprising:
   accepting data representing a region of an image containing an unknown text;

using a first text recognition procedure to process the accepted data, including identifying a set of character sequences that hypothetically represent the unknown text and identifying variable width segments in the image, each variable width segment corresponding to a character in a character sequence of the set of character sequences;

computing, for each segment of the identified variable width segments, one or more segmental features from the portion of the image associated with that segment; and using the computed segmental features to determine, for at least some character sequences of the set of character sequences identified using the first text recognition procedure, a recognition score for said character sequence.

28. The method of claim 27 further comprising selecting a best scoring character sequence as a recognition of the image according to the determined recognition scores.

29. The method of claim 27 wherein the first text recognition procedure comprises a Hidden Markov Model (HMM) text recognition procedure, and wherein the processing comprises determining a sequence of fixed-width analysis features for the image, and processing said fixed-width analysis features using the HMM text recognition procedure.

30. The method of claim 29 wherein identifying the set of character sequences comprises using the HMM text recognition procedure to identify an N-best list of character sequences.

31. The method of claim 30 wherein determining the recognition score for a character sequence comprises combining a score determined using the HMM text recognition procedure and scores determined from the computed segmental features for segments corresponding to characters in the character sequence.

32. The method of claim 27 wherein identifying the variable width segments includes grouping fixed width segments used by the first text recognition procedure.

33. The method of claim 32 wherein the first text recognition procedure comprises a Hidden Markov Model (HMM) text recognition procedure configured to process the fixed width segments, and wherein identifying the variable width segments comprises grouping the fixed width segments according to a state sequence identified by the HMM text recognition procedure.

34. The method of claim 33 wherein identifying the variable width segments further includes identifying variable width segments according to perturbations of segment boundaries identified by the first text recognition procedure.

* * * * *